(12) United States Patent
Tsai

(10) Patent No.: US 7,520,687 B2
(45) Date of Patent: Apr. 21, 2009

(54) LENS COVER APPARATUS FOR CAMERA

(75) Inventor: Yao-Ching Tsai, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 401 days.

(21) Appl. No.: 11/339,348

(22) Filed: Jan. 25, 2006

(65) Prior Publication Data

US 2007/0081819 A1    Apr. 12, 2007

(30) Foreign Application Priority Data

Oct. 6, 2005    (TW) .............................. 94134970 A

(51) Int. Cl.
*G03B 17/00*    (2006.01)
*G03B 9/10*    (2006.01)

(52) U.S. Cl. ...................... 396/448; 396/493

(58) Field of Classification Search ............. 359/611, 359/819; 396/448–452, 479–481, 483, 493, 396/495, 496; 348/373–376

See application file for complete search history.

(56) References Cited

U.S. PATENT DOCUMENTS

| | | | | |
|---|---|---|---|---|
| 4,283,132 A | * | 8/1981 | Engelsmann et al. | 396/448 |
| 4,681,418 A | * | 7/1987 | Kodaira | 396/73 |
| 5,913,089 A | | 6/1999 | Ebe | |
| 6,254,289 B1 | | 7/2001 | Manabe et al. | |
| 6,641,311 B2 | * | 11/2003 | Yoshida et al. | 396/448 |
| 6,748,168 B2 | * | 6/2004 | Nishiwaki et al. | 396/176 |
| 2004/0165881 A1 | * | 8/2004 | Hisamatsu | 396/448 |
| 2007/0025725 A1 | * | 2/2007 | Yen | 396/448 |

* cited by examiner

*Primary Examiner*—W. B. Perkey
*Assistant Examiner*—Minh Phan

(57) ABSTRACT

A lens cover apparatus for camera includes a housing, a cover, and a push rod. The cover is rotatably mounted to the housing to open/close a lens window for selectively exposing/shielding a lens of the camera. The push rod is manually movable with respect to the housing to induce a horizontal movement, which is converted into a rotary motion of the cover by a linkage mechanism that has a lever forming a groove movably receiving and guiding the cover.

14 Claims, 3 Drawing Sheets

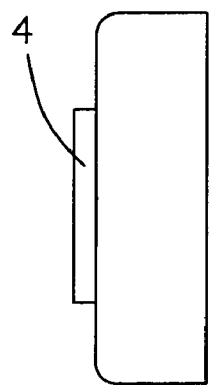
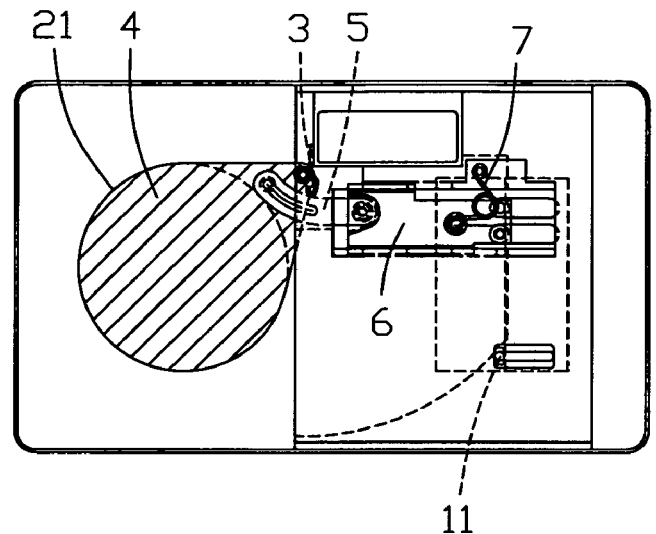
FIG. 2a    FIG. 2b
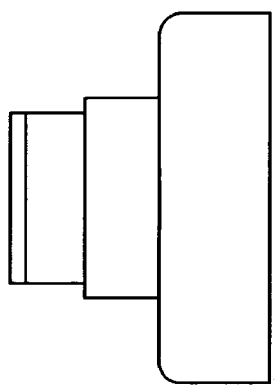
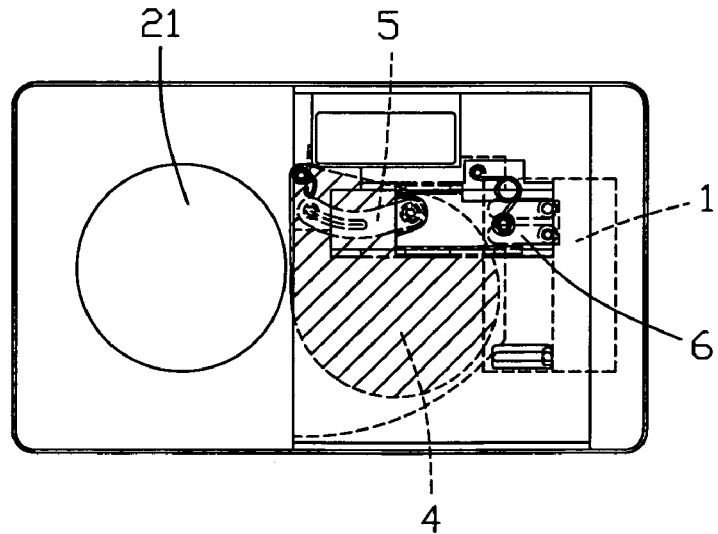
FIG. 3a    FIG. 3b

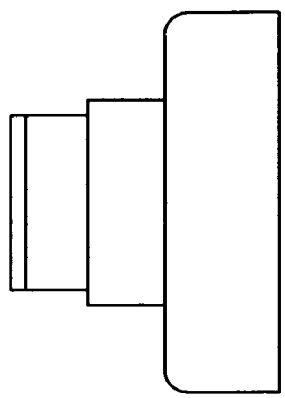
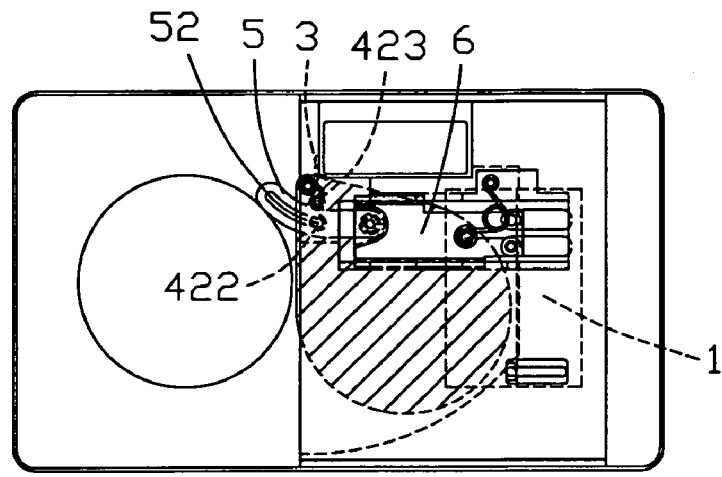
FIG. 4a　　　FIG. 4b
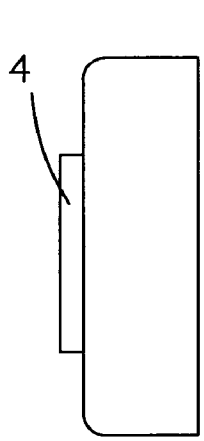
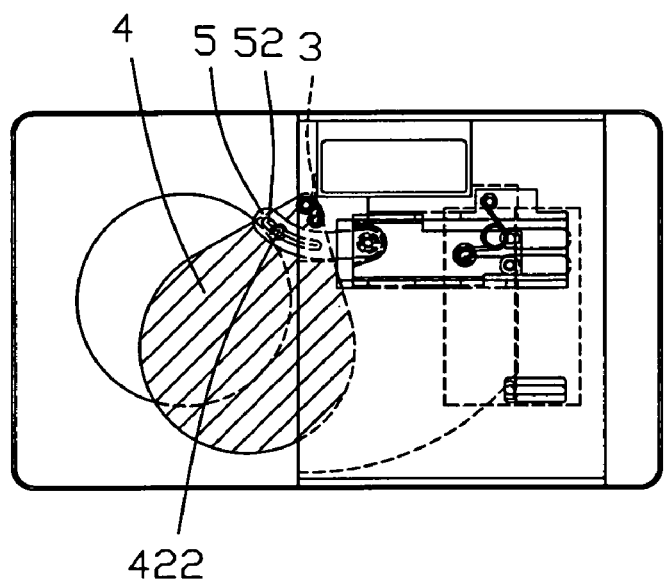
FIG. 5a　　　FIG. 5b

LENS COVER APPARATUS FOR CAMERA

BACKGROUND OF THE INVENTION

1. Field of the Invention

The present invention relates to a lens cover apparatus for camera, and more particularly, to a reliable lens cover apparatus for camera.

2. Description of the Related Arts

In photography, image quality of pictures is generally dependent on the lens and films for conventional cameras or charge-coupled devices for digital cameras. However, physical damages, such as flaws and scars, caused by undesired or accidental contact of the lens by a rigid object, and contaminations caused by dirt, grease, and fingerprints, often make problems in the maintenance of the lens, which seriously affects the image quality of pictures taken with the lens. It is thus very important to protect the lens in the maintenance of the camera. In practice, lens covers are often adopted to protect the lens.

The conventional lens covers are divided in two types: clipping type covers and mechanical type covers.

The clipping type cover is a disc-like device, and usually has a pair of clips that is engageable with a lens barrel to secure the cover in front of the lens. Most of the clipping type covers are separate parts, independent of the camera itself, and are usually tied to the cameras with a string to avoid being lost. These covers are very common in the conventional cameras, but not used so often in the digital camera industry.

The mechanical type covers can be divided into motor-driven type covers and hand-driven type covers. Both employ mechanics to selectively open/close the cover and thus exposing/shielding the lens.

The present invention is aimed to provide a manually operated tens cover for cameras.

SUMMARY OF THE INVENTION

An object of the present invention is to provide a reliable lens cover apparatus for camera, which opens/closes a lens cover.

A lens cover apparatus for camera in accordance with the present invention comprises a housing, a cover, and a push rod. The cover is rotatably mounted in the housing to open/close a lens windows to selectively expose/shield a lens of the camera. The push rod is manually movable with respect to the housing to induce a horizontal movement, which is converted into rotary motion of the cover by a linkage mechanism that has an actuating lever forming a groove movably receiving and guiding the cover.

The present invention enables easy, steady, and reliable operation of the cover, and simplifies the process.

Other objects, advantages, and novel features of the invention will become more apparent from the following detailed description of a preferred embodiment when taken in conjunction with the accompanying drawings, wherein:

BRIEF DESCRIPTION OF THE DRAWINGS

FIG. 2a is a left view of the lens cover apparatus showing the cover in a closed position;

FIG. 2b is a front view of the lens cover apparatus showing the cover in a closed position;

FIG. 3a is a left view of the lens cover apparatus showing the cover in an open position;

FIG. 3b is a front view of the lens cover apparatus showing the cover in an open position;

FIG. 4a is a left view of the lens cover apparatus showing the cover in a closed position while the lens is still shooting out;

FIG. 4b is a front view of the lens cover apparatus showing the cover in a closed position while the lens is still shooting out;

FIG. 5a is a left view of the lens cover apparatus showing the cover in a closed position and the lens is taken back; and FIG. 5b is a front view of the lens cover apparatus showing the cover in a closed position and the lens is taken back.

DETAILED DESCRIPTION OF THE PREFFERRED EMBODIMENT

Figure 1:
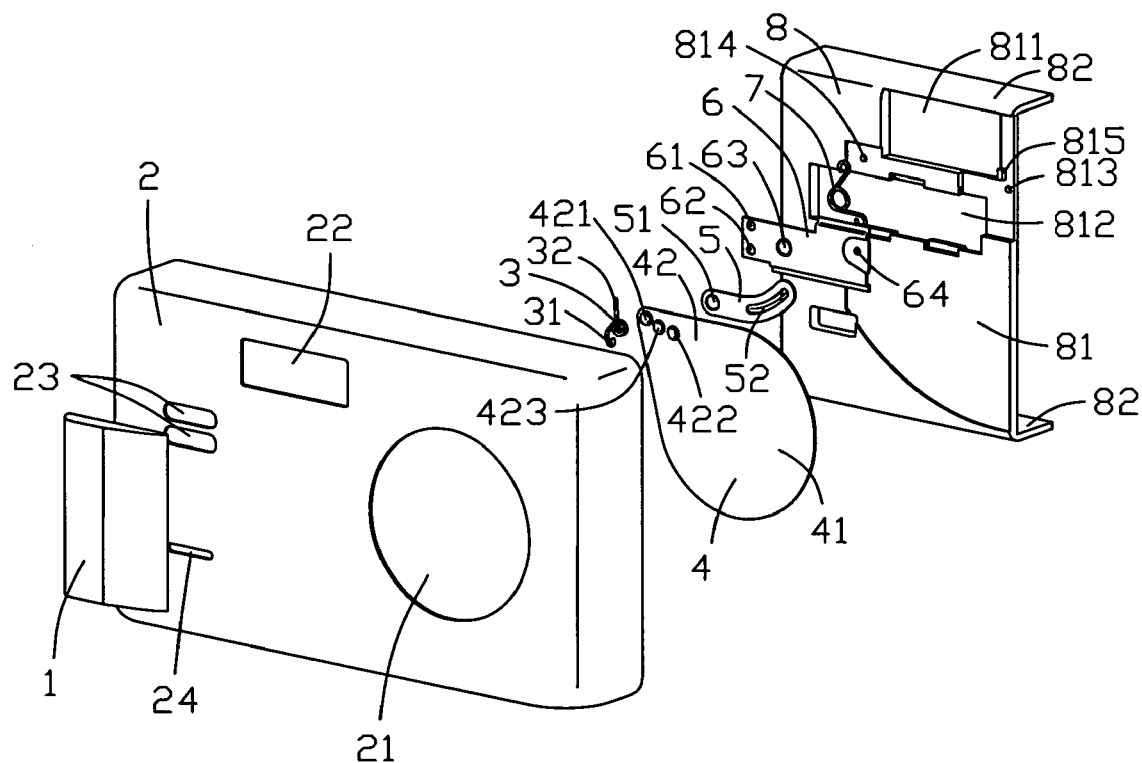
FIG. 1 is an exploded view of a lens cover apparatus for camera in accordance with the present invention.

With reference to the drawings and particular to FIGS. 1 and 2, a lens cover apparatus constructed in accordance with the present invention comprises a housing 2, a push rod 1 movably mounted on the housing 2, a cover 4 for shielding/exposing a lens of a camera (both not shown), a cover spring 3 engaging with the housing 2 to actuate the cover 4, a fixing plate 8 fixed in the housing 2, an actuating plate 6 fixed with the push rod 1 and movably arranged with the fixing plate 8, an actuating lever 5 fixing with the actuating plate 6 and guiding the movement of the cover 4.

The push rod 1, which is shaped like a small flat rectangular case, is movable on an outside wall (not labeled) of the housing 2. The push rod 1 has a back surface facing the outside wall of the housing 2 and two posts or pegs (not shown) projecting from the back surface extend through slits 23 defined in the outside wall of the housing 2 to connect with the actuating plate 6 whereby the actuating plate 6 is movable in unison with the push rod 1.

The push rod 1 further comprises a slider 11 (see FIG. 2b) slidably received and engaging an engaging slot 24 defined in the outside wall of the housing 2.

The housing 2 is a substantially flat rectangular hollow case having an open side opposite to the outside wall. The housing 2 forms in the outside wall thereof a lens window 21, preferably a circular opening, for the lens of the camera and a flash window 22 for a flash (not shown) of the camera.

The cover 4 is arranged inside the housing 2 and rotatable with respect to the outside wall of the housings 2 to close/open the lens window 21. The cover 4 comprises a plate 41 having a substantially circular shape and a connecting portion 42 smoothly extending from an external circumference of the plate 41. Apparently, the plate portion 41 is of a size substantially corresponding to and selectively and completely covering the lens windows 21. The connecting portion 42 defines a first fixing hole 421 at an end thereof, a first actuating hole 422 at a location on an imaginary line connecting the first fixing hole 421 and a center of the circle of the plate 41, and a coupling hole 423.

The actuating lever 5 comprises an arc-shaped flat member, in which a first arc-shaped groove 52 is defined, extending from a location close to an end of the arc member. The actuating lever 5 defines a second fixing hole 51 at an opposite end of the arc member.

The actuating plate 6 is substantially a rectangular flat plate, in which first and second engaging holes 61, 62 are defined to receive and thus engage the pegs of the push rod 1. The actuating plate 6 also defines a third engaging hole 63 substantially at a central portion of the actuating plate 6. An actuating spring 7, such as a torsion spring having first and second arms, is arranged between the actuating plate 6 and the fixing plate 8 by having the first arm attached to the third engaging hole 63 by for example a rivet (not shown) and the second arm fixed to the fixing plate 8. The actuating plate 6 also defined a third fixing hole 64 at a position corresponding to the second fixing hole 51 of the actuating lever 5. The actuating lever 5 and actuating plate 6 are collectively referred to as a linkage mechanism.

The fixing plate 8 is received in and fixed to the housing 2. The fixing plate 8 comprises a rectangular flat body 81 and opposite upper and lower support portions 82 respectively extending from upper and lower edges of the rectangular flat body 81. The body 81 forms a flash hole 811 corresponding in position to the flash widow 22 for exposing the camera flashlight. A second groove 812 is formed below the flash hole 811 to movably engage with the actuating plate 6. A fourth engaging hole 814 is defined above the second groove 812 to receive and thus engage the second arm of the actuating spring 7 with for example a rivet (not shown). The fixing plate 8 forms a projection 815 at a location above the fourth engaging hole 814. The projection 815 defines a slot (not shown). A fourth fixing hole 813 is defined at an edge of the fixing plate 8 near the projection 815.

In assembly, the actuating plate 6 is movably received in the second groove 812. The two arms of the actuating spring 7 respectively couple with the third engaging hole 63 of the actuating plate 6 and the fourth engaging hole 814 of the fixing plate 8. A pivot pin (not labeled) extends through the second fixing hole 51 of the actuating lever 5 and the third fixing hole 64 of the actuating plate 6 to retain the actuating lever 5 and the actuating plate 6 together but allowing the actuating lever 5 to rotate with respect to the actuating plate 6. Another pivot pin (also not labeled) extends through the first fixing hole 421 of the cover 4 and the fourth fixing hole 813 of the fixing plate 8 to allow the cover 4 to be rotatable with respect to the fixing plate 8.

The cover spring 3, serving as an energy storage and biasing means, is a torsion spring having a coil from which a straight arm 32 and a bent arm 31 extend. The coil of the cover spring 3 is fit over the pivot pin that connects the cover 4 to the fixing plate 8 with the straight arm 32 received and retained in a slot defined in the projection 815 of the fixing plate 8 and the bent arm 31 attached to the coupling hole 423 of the cover 5 to provide a basing force between the fixing plate 8 and the cover 4.

A further pin (also not labeled) extends through the first actuating hole 422 of the cover 4 and is movably received in the first groove 52 of the actuating arm 5.

The operation of the lens cover apparatus will be described.

Referring to FIGS. 2a and 2b, when the cover 4 is at a closed position, and camera power is off, the push rod 1 stays in a closed position, and the lens lies in the camera. Because of the biasing force of the cover spring 3, the cover 4, being supported by the actuating arm 5, is maintained at the closed position to shield the lens window 21. At this situation, both the actuating lever 5 and the actuating plate 6 remain at the closed positions.

Referring to FIGS. 3a and 3b, to open the camera lens, the push rod 1 is pushed in a given direction, such as rightwards in the embodiment illustrated, the actuating plate 6, being movable in unison with the push rod 1 through the engagement between the pegs of the push rod 1 and the first and second engaging holes 61, 62 of the actuating plate 6, follows the push rod 1, thereby moving the actuating lever 5 to drive the cover 4 to swing in a corresponding direction, such as counterclockwise in the embodiment illustrated. The actuating plate 6 and the actuating lever 5 are then set to the open positions, and the cover 4 is also moved to an open position to un-shield and thus expose the lens window 21. The camera may comprise a powering mechanism that is synchronously operated with the lens cover apparatus to turn on the camera power and means for simultaneously extending the lens out.

Referring to FIGS. 4a and 4b, to turn off the camera, the push rod 1 is pushed in an opposite direction, such as rightwards in the embodiment illustrated, back to the initial position. The actuating plate 6 and the actuating lever 5 are then moved in a reversed manner. In case the lens has not yet been completely moved back into the camera, the movement of the actuating plate 6 and the actuating lever 5 causes the cover 4 to physically engage the lens that is not completely withdrawn back into the camera. The cover 4 is thus prevented from moving toward the closed position. In other words, although the actuating lever 5 and the actuating plate 6 are driven by the movement of the push rod 1 to the closed position, the cover 4 still remains in an open condition, at least partly. In this situation, the cover spring 3 that is arranged between the cover 4 and the fixing plate 8 is deformed and potential energy is built in the spring 3. The potential energy of the deformed spring 3 induces a basing force on the cover 4 to resiliently force the cover 4 against the un-withdrawn lens.

Further referring to FIGS. 5a and 5b, once the lens is completely withdrawn back into the camera, the engagement between the cover 4 and the lens is removed and the basing force induced by the potential energy of the cover spring 3 immediately drives the cover 4 toward the closed position to shield the lens. The cover spring 3 releases the elastic potential energy to rotate the cover 4 in for example clockwise direction. The cover 4 moves, under the guidance by the first groove 52 of the actuating lever 5, until it completely shields the lens windows 21.

It will be understood that the present invention may be embodied in other specific forms without departing from the spirit or central characteristics thereof. The present examples and embodiments, therefore, are to be considered in all respects illustrative and not restrictive, and the invention is not be limited to the details given herein.

What is claimed is:

1. A lens cover apparatus for camera, comprising:
   a housing defining a lens window for a lens of a camera;
   a cover movably mounted on the housing to move along an arc path between a closed position where the lens window is closed and an open position where the lens window is opened for selectively exposing the lens;
   a push rod mounted on the housing and movable along a linear path between first and second positions; and
   a linkage mechanism coupled between the push rod and the cover to drive the cover between the closed position and the open position when the push rod is moved between the first and second positions, the linkage mechanism comprising a first member that is linearly movable in unison with the push rod and a second member pivoted to the first member and defining an arc slot to guide the movement of the cover along the arc path.

2. The lens cover apparatus as claimed in claim 1 further comprising a fixing plate fixed in the housing to rotatably support the cover for the movement of the cover between the open position and the closed position.

3. The lens cover apparatus as claimed in claim 1, wherein the cover comprises a pin movably received in the arc slot of the second member of the linkage mechanism to guide the movement of the cover between the open position and the closed position.

4. The lens cover apparatus as claimed in claim 1 further comprising an elastically deformable element arranged between the cover and the housing to build potential energy therein due to elastic deformation caused by a difference between the movements of the linkage mechanism and the cover, the potential energy inducing a force that biases the cover toward the closed position.

5. The lens cover apparatus as claimed in claim 4, wherein the elastically deformable element comprises a spring.

6. The lens cover apparatus as claimed in claim 5, wherein the elastically deformable element comprises a torsion spring having two arms respectively attached to the cover and the housing.

7. A lens cover apparatus for camera, comprising:
a cover movable between a closed position where the cover shields a camera lens and an open position where the camera lens is exposed;
a push rod movable between first and second positions;
a linkage mechanism coupled between the cover and the push rod to guide the cover between the closed position and the open position when the push rod is moved between the first and second positions, the linkage mechanism comprising a first member that is linearly movable in unison with the push rod and a second member pivoted to the first member and defining an arc slot to guide the movement of the cover along an arc path between the closed position and the open position; and
an elastically deformable element arranged between the cover and the linkage mechanism to build potential energy therein due to elastic deformation caused by a difference between the movements of the linkage mechanism and the cover, the potential energy inducing a force that biases the cover toward a closed position.

8. The lens cover apparatus as claimed in claim 7 further comprising a housing in which a fixing plate is retained, the housing defining a lens window for the camera lens, the fixing plate movably supporting the cover to allow the cover to switch between the closed position where the cover closes the lens windows and thus shielding the camera lens and the open position where the cover opens the lens windows to expose the camera lens.

9. The lens cover apparatus as claimed in claim 8, wherein the push rod is fixed to the first member to drive the linkage mechanism between the first and second positions.

10. The lens cover apparatus as claimed in claim 8, wherein the elastically deformable element comprises a spring fixed to both the cover and the housing.

11. The lens cover apparatus as claimed in claim 10, wherein the elastically deformable element comprises a torsion spring having two arms respectively fixed to the cover and the housing.

12. The lens cover apparatus as claimed in claim 8, wherein the fixing plate movably supports the first member of the linkage mechanism, a resilient member arranged between the first member and the fixing plate to provide a biasing force therebetween.

13. The lens cover apparatus as claimed in claim 12, wherein the resilient member comprises a spring having two ends attached to the first member of the linkage mechanism and the fixing plate respectively.

14. The lens cover apparatus as claimed in claim 13, wherein the resilient member comprises a torsion spring.

* * * * *